US012451649B2

(12) United States Patent
Paynter et al.

(10) Patent No.: US 12,451,649 B2
(45) Date of Patent: Oct. 21, 2025

(54) GANGED COAXIAL CONNECTOR ASSEMBLY WITH LATCH

(71) Applicant: Outdoor Wireless Networks LLC, Claremont, NC (US)

(72) Inventors: Jeffrey D. Paynter, Momence, IL (US); Bhavin Kadakia, Plainfield, IL (US); ChuanHui Liu, Suzhou (CN)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 803 days.

(21) Appl. No.: 17/729,317

(22) Filed: Apr. 26, 2022

(65) Prior Publication Data

US 2022/0368072 A1 Nov. 17, 2022

Related U.S. Application Data

(60) Provisional application No. 63/187,581, filed on May 12, 2021.

(51) Int. Cl.
*H01R 13/629* (2006.01)
*H01R 24/40* (2011.01)
(Continued)

(52) U.S. Cl.
CPC ....... *H01R 13/62933* (2013.01); *H01R 24/40* (2013.01); *H01R 25/003* (2013.01); *H01R 2103/00* (2013.01)

(58) Field of Classification Search
CPC ......................... H01R 13/62933; H01R 24/40; H01R 25/003; H01R 2103/00
See application file for complete search history.

(56) References Cited

U.S. PATENT DOCUMENTS 5,876,225 A * 3/1999 Katsuma .......... H01R 13/62938 439/157
2016/0134052 A1 5/2016 Cho et al.
(Continued)

FOREIGN PATENT DOCUMENTS

KR 20090002260 U 3/2009
KR 102134776 B1 * 7/2020
KR 20210006685 A 1/2021

OTHER PUBLICATIONS

International Preliminary Report on Patentability corresponding to PCT/US2022/026116; Issued Nov. 14, 2023 (8 pages).
(Continued)

*Primary Examiner* — Briggitte R. Hammond
(74) *Attorney, Agent, or Firm* — Myers Bigel, P.A.

(57) ABSTRACT

A ganged connector assembly includes: a plurality of coaxial cables; a plurality of coaxial connectors, each of the coaxial connectors connected with a respective one of the plurality of coaxial cables; a shell surrounding the coaxial connectors, the shell defining a plurality of electrically isolated cavities, each of the coaxial connectors being located in a respective cavity; a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and a radially outwardly-extending protrusion associated with the post that prevents the latch from slipping off of the post.

18 Claims, 6 Drawing Sheets

(51) Int. Cl.
*H01R 25/00* (2006.01)
*H01R 103/00* (2006.01)

(56) References Cited

U.S. PATENT DOCUMENTS

| | | | |
|---|---|---|---|
| 2019/0312394 | A1 | 10/2019 | Paynter et al. |
| 2019/0363481 | A1 | 11/2019 | Paynter et al. |

OTHER PUBLICATIONS

"International Search Report and Written Opinion corresponding to International Application No. PCT/US2022/026119 mailed Aug. 12, 2022".

* cited by examiner

GANGED COAXIAL CONNECTOR ASSEMBLY WITH LATCH

RELATED APPLICATION

The present application claims priority from and the benefit of U.S. Provisional Patent Application No. 63/187,581, filed May 12, 2021, the disclosure of which is hereby incorporated herein by reference in full.

FIELD OF THE INVENTION

The present invention relates generally to electrical cable connectors and, more particularly, to ganged connector assemblies.

BACKGROUND OF THE INVENTION

Coaxial cables are commonly utilized in RF communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Some coaxial connector interfaces utilize a retainer (often provided as a threaded coupling nut) that draws the connector interface pair into secure electro-mechanical engagement as the coupling nut, rotatably retained upon one connector, is threaded upon the other connector.

Alternatively, connection interfaces may be also provided with a blind mate characteristic to enable push-on interconnection, wherein physical access to the connector bodies is restricted and/or the interconnected portions are linked in a manner where precise alignment is difficult or not cost-effective (such as the connection between an antenna and a transceiver that are coupled together via a rail system or the like). To accommodate misalignment, a blind mate connector may be provided with lateral and/or longitudinal spring action, or "float," to accommodate a limited degree of insertion misalignment. Blind mated connectors may be particularly suitable for use in "ganged" connector arrangements, in which multiple connectors (for example, four connectors) are attached to each other and are mated to mating connectors simultaneously.

Examples of ganged coaxial connectors are discussed in U.S. Patent Publication No. 2019/0312394 to Paynter, the disclosure of which is hereby incorporated herein by reference in full. This publication identifies solutions for two different issues that can arise with ganged blind mate connectors: "float" and secure interconnection. Ganged connectors are shown therein with a common shell. Each individual "male" connector is sized to be able to "float" axially, angularly and radially relative to the shell. Also, each individual "male" connector engages a respective helical spring that also engages the shell. Although each connector can move relative to the shell to adjust during mating, compression in the spring can provide sufficient force that, once the male connector is mated, the male connector is maintained in position relative to the shell. The ganged male connectors are secured to the mating "female" connectors via a pivoting latch that captures a pin on gang of male connectors.

It may be desirable to develop additional concepts and solutions for ganged coaxial connectors.

SUMMARY OF THE INVENTION

As a first aspect, embodiments of the invention are directed to a ganged connector assembly. The assembly comprises: a plurality of coaxial cables; a plurality of coaxial connectors, each of the coaxial connectors connected with a respective one of the plurality of coaxial cables; a shell surrounding the coaxial connectors, the shell defining a plurality of electrically isolated cavities, each of the coaxial connectors being located in a respective cavity; a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition: and a radially outwardly-extending protrusion associated with the post that prevents the latch from slipping off of the post.

As a second aspect, embodiments of the invention are directed to a ganged connector assembly comprising: a plurality of coaxial cables; a plurality of coaxial connectors, each of the coaxial connectors connected with a respective one of the plurality of coaxial cables; a polymeric shell surrounding the coaxial connectors, the shell defining a plurality of electrically isolated cavities, each of the coaxial connectors being located in a respective cavity; a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and a radially outwardly-extending protrusion that is unitary with the post that prevents the latch from slipping off of the post, wherein the protrusion comprises a lip that extends only partially around an outer surface of the post.

DETAILED DESCRIPTION OF THE INVENTION

Figure 1:
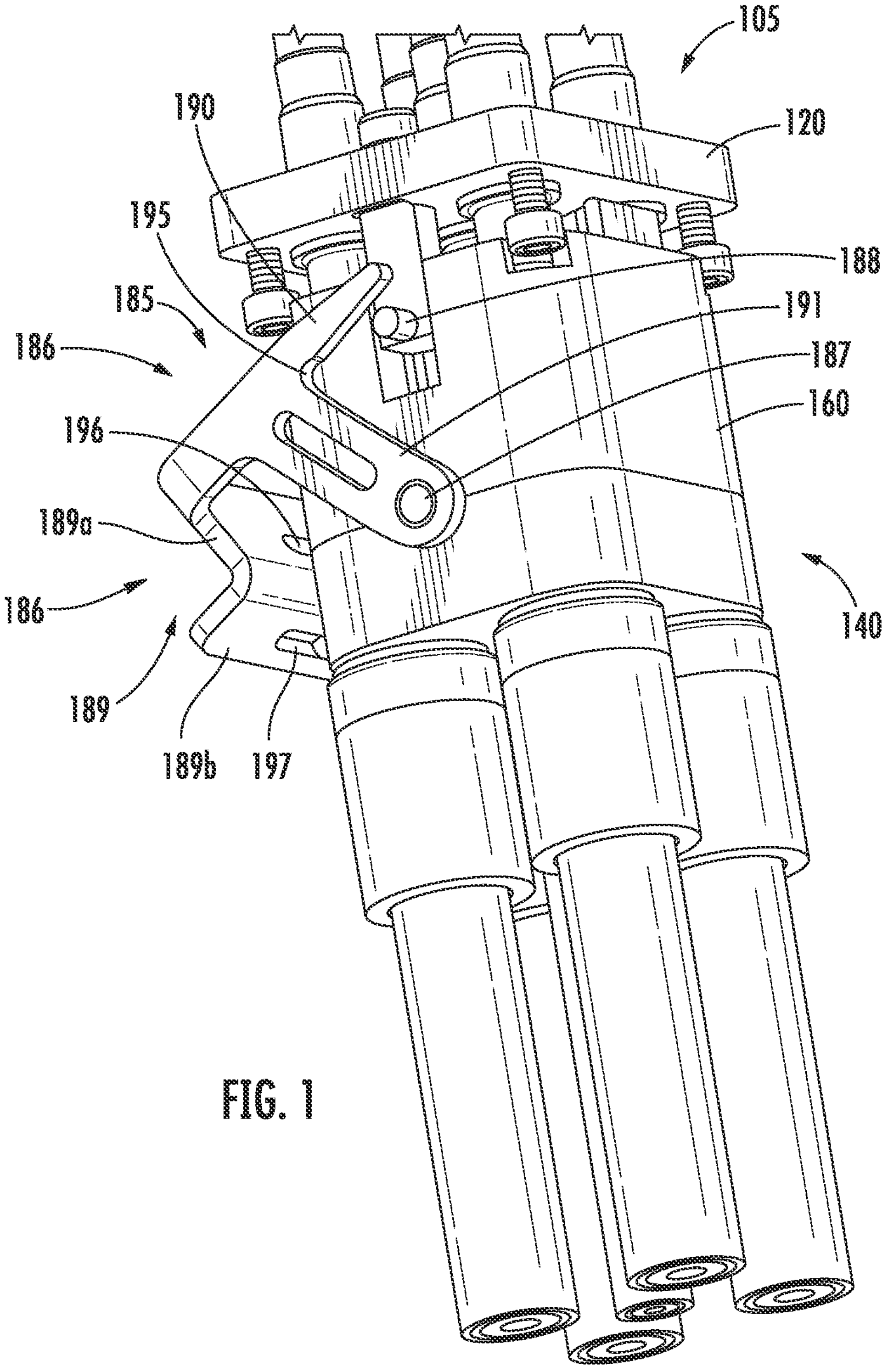
FIG. 1 is a perspective view of an assembly of ganged connectors, with the latch in the unsecured position.
Figure 2:
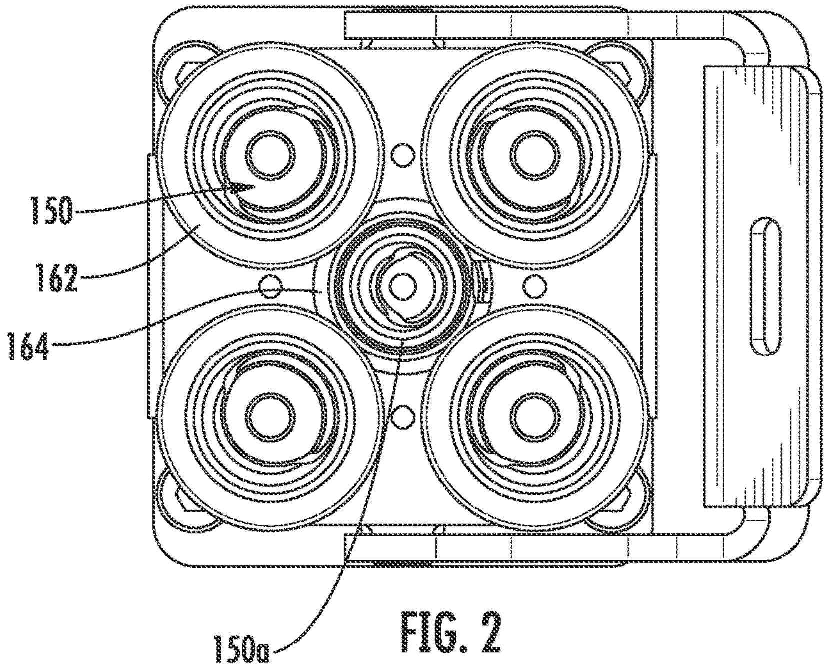
FIG. 2 is an end view of the cable connector assembly of FIG. 1.
Figure 3:
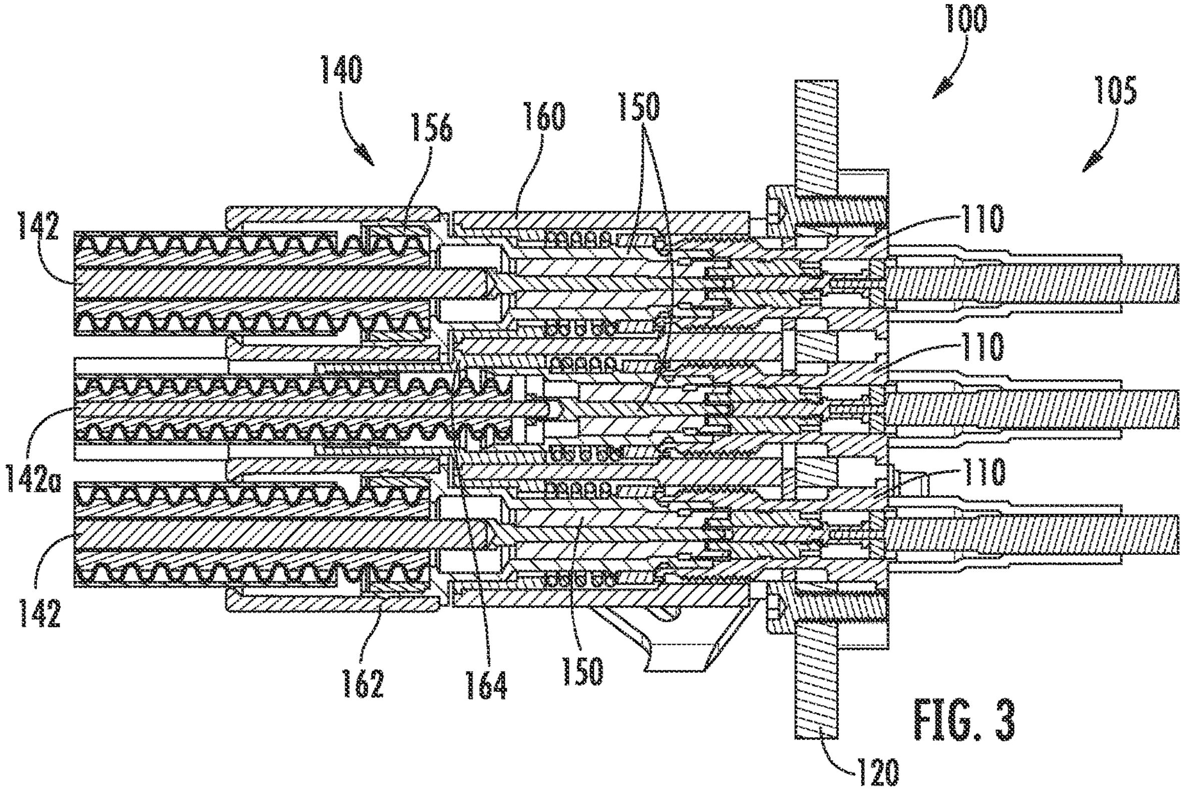
FIG. 3 is a side section view of the assembly of FIG. 1, shown in a mated condition.
Figure 4:
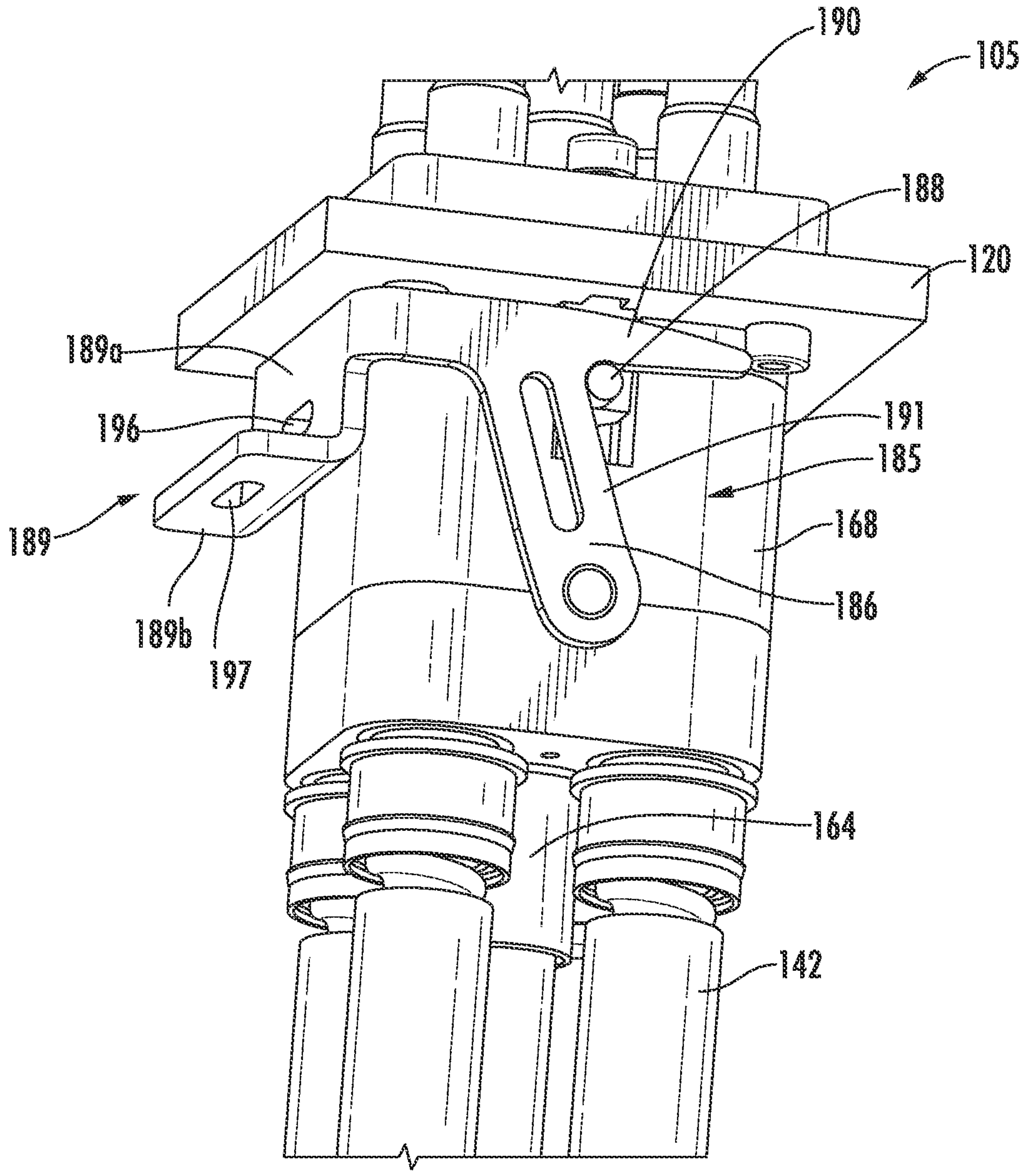
FIG. 4 is a perspective view of the assembly of FIG. 1 shown with the latch in the secured position.
Figure 5:
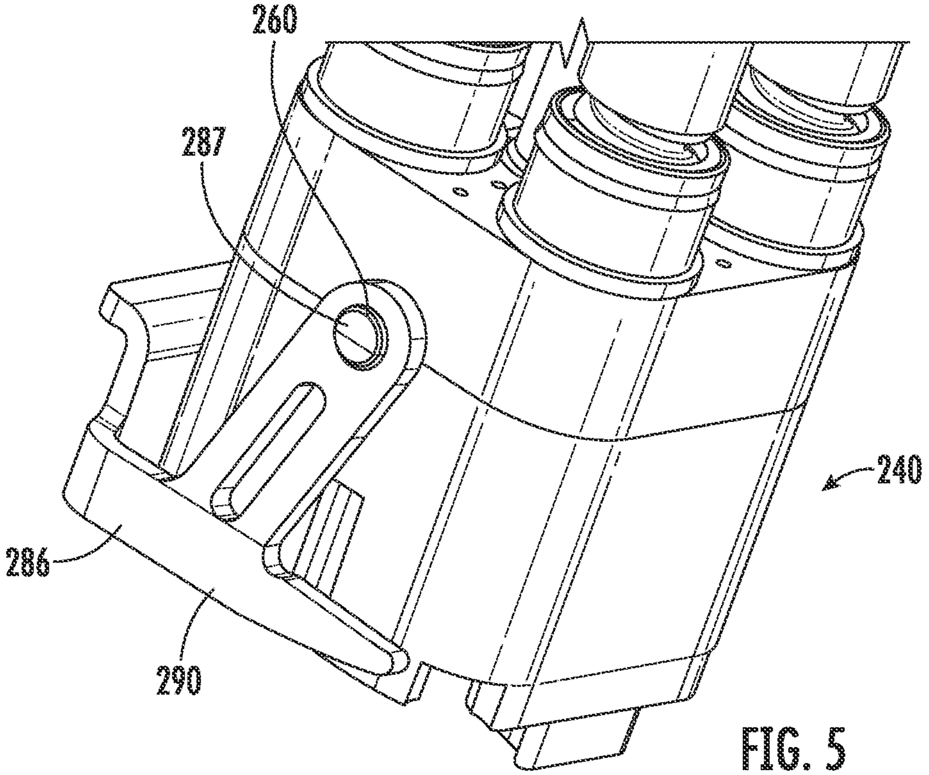
FIG. 5 is a perspective view of a cable connector assembly according to embodiments of the invention.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Referring now to FIGS. 1-4, an embodiment of a mated ganged assembly is shown therein and designated broadly at 100. The assembly 100 includes an equipment connector assembly 105 having connectors 110 mating with a cable connector assembly 140 and a shell 160. The cable connector assembly 140 includes five total cables in a cruciform arrangement, four of which (designated at 142) are of a larger size (e.g., a 3/8 inch cable) than a fifth cable 142*a* (e.g., a % inch cable). The cable 142*a* is located at the center or intersection of the "cross" formed by the cables 142, 142*a*. The cable connector assembly 140 also includes five connectors, four of which (designated 150) are attached to the larger cables 142, and one of which (designated 150*a*) is shorter in overall length and is attached to the smaller cable 142*a*. The smaller cable 142*a* and smaller connector 150*a* may be employed in the center port position, which is typically used for calibration purposes. A generally cylindrical protective boot 162 is present to protect each larger cable-connector interface, and a smaller protective boot 164 is present to protect the interface of the connector 150*a* and the cable 142*a*.

The cable connector assembly 140 includes a toggle assembly 185 with an L-shaped latch 186 mounted to the shell 160 of the cable connector assembly 140 at a pivot defined by a post 187, and further includes a pin 188 mounted to the mounting plate 120 of the equipment connector assembly 105. A handle 189 has generally perpendicular panels 189*a*, 189*b*. The panel 189*a* extends generally perpendicular to a finger 190 on the latch 186 and generally parallel to an arm 191 that extends between the finger 190 and the post 187. The finger 190 includes a recess 195 adjacent the arm 191. The handle 189 includes two slots 196, 197, one in each of the panels in of the handle 189*a*, 189*b*.

The latch 186 can be pivoted via the handle 189 into engagement with the pin 188 to secure the assemblies 105, 140 to each other. As the finger 190 initially contacts the pin 188, the handle 189 is relatively easily pivoted about the post 187 toward the latched position. The assembly 100 is fully secured with the toggle assembly 185 when the latch 186 pivots sufficiently that the finger 190 moves relative to the pin 188 so that the pin 188 slides into the recess 195. Because in the secured position the handle 189 is generally level with the pin 188 and generally perpendicular to a line between the post 187 and the recess 195, significantly greater mechanical force is required on the handle 189 to move the latch 186 from the recess 195 back to its unsecured position. A screwdriver, wrench or other lever inserted into one of the slots 196, 197 may be used to create sufficient force to secure or unsecure the latch 186. As such, once secured, the assembly 100 will tend to remain in the secured condition.

In some instances, the force exerted on the latch 186 in the secured condition or when moving to or from the secured condition may be sufficiently high that there may be a risk of the latch 186 slipping off of the post 187. As such, it may be desirable to provide a configuration that addresses this possibility.

Further discussion of such latches may be found in U.S. Patent Publication No. 2019/0312394 to Paynter, supra, and U.S. Patent Publication No. 2019/0363481 to Paynter, the disclosure of which is hereby incorporated by reference herein in full.

Figure 6:
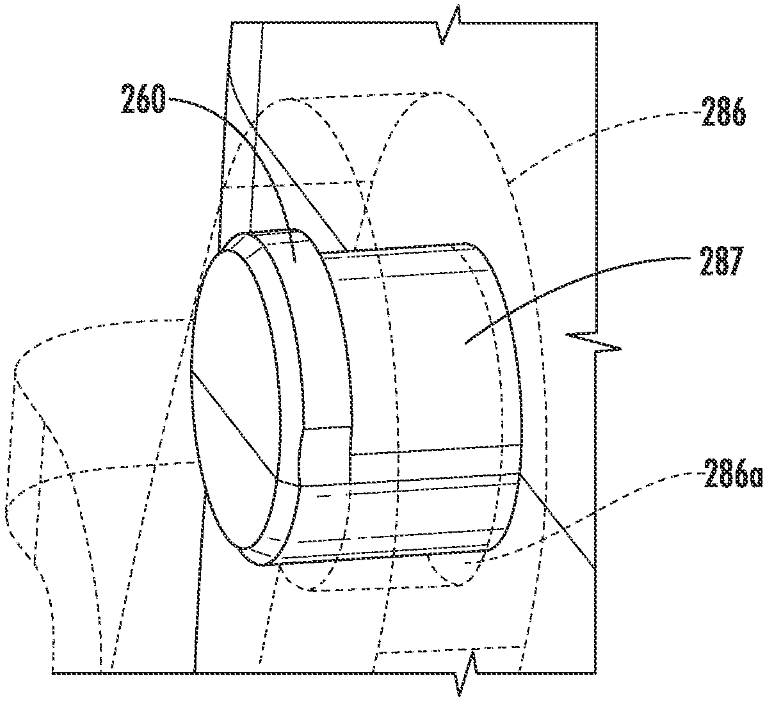
FIG. 6 is a greatly enlarged perspective view of one of the posts for the latch of the cable connector assembly of FIG. 5.
Figure 7:
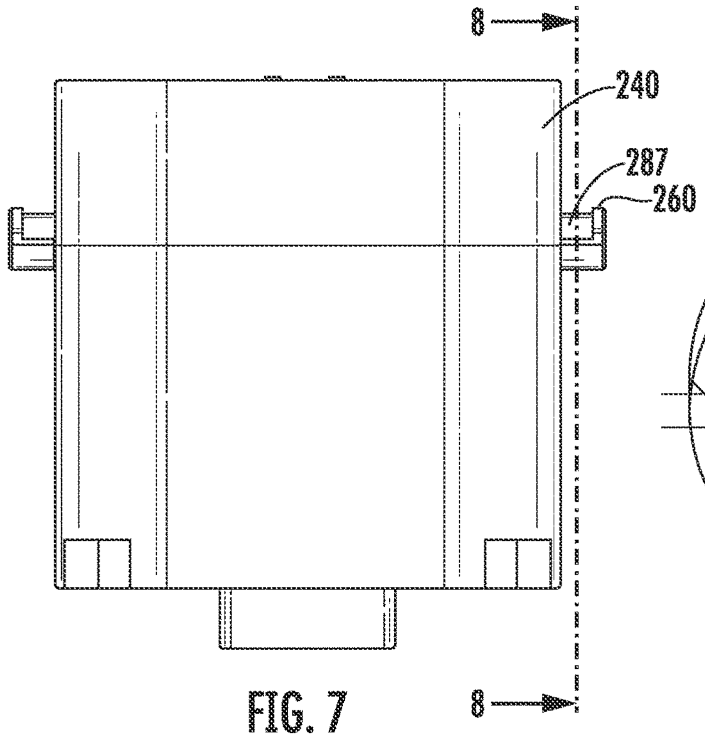
FIG. 7 is a side view of the shell of the cable connector assembly of FIG. 5 with the latch removed for clarity.
Figure 8:
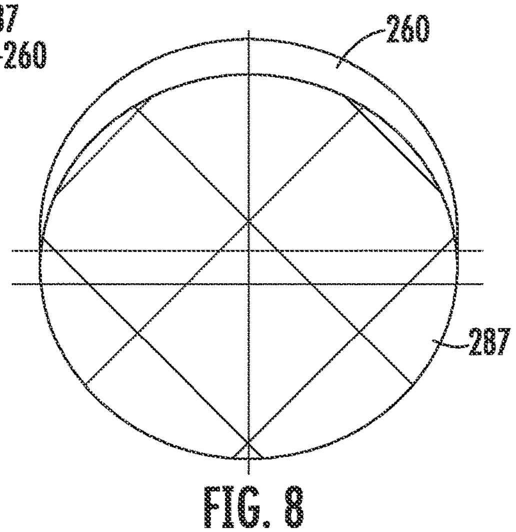
FIG. 8 is a section view of the post of FIG. 6 taken along lines 8-8 of FIG. 7.

Referring now to FIGS. 5-8, a cable connector assembly 240 with a different configuration is shown therein. In the cable connector assembly 240, the post 287 that serves as the attachment point and the pivot axis for the latch 286 has an outer lip 260 that extends in a direction generally normal to and away from the finger 290 of the latch 286. As can be seen in FIGS. 6-8, the lip 260 extends circumferentially over about 180 degrees of the post 287, such that the portion of the perimeter of the post 287 nearest the finger 290 has no lip. The latch 286 has a hole 286*a* that receives the post 287.

It can be seen in FIG. 8 that in the illustrated embodiment, the perimeter of the lip 260 is in essence a half-circle that has the same radius as the post 287, but the center of that half-circle is offset slightly (in a direction away from the finger 287) from the center of the post 287. Thus, the post 287 is slightly oval (slightly wider than tall) in cross-section, and the lip 260 and the lower half of the post 287 form a circle.

In this configuration, the latch 286 can rotate about the post 287 between the secured and unsecured positions. When the latch 286 is in the secured position, the latch 286 is drawn toward the pin 287. This force draws the latch 286 toward the upper end of the post 287, such that the lip 260 can maintain the latch 286 in place and prevent it from slipping off of the post 287.

Figure 9:
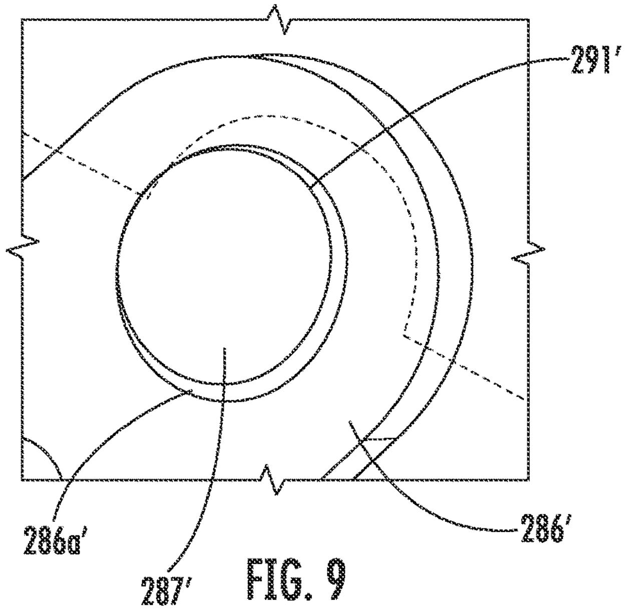
FIG. 9 is a greatly enlarged view of a post for a latch for the cable connector assembly of FIG. 5 according to alternative embodiments of the invention.
Figure 10:
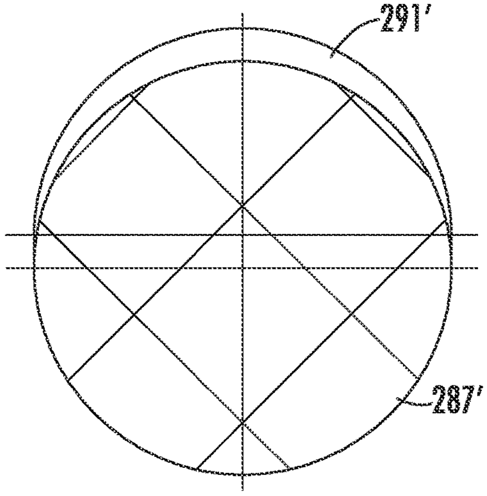
FIG. 10 is a section view of the post of FIG. 9.

As an alternative, FIGS. 9 and 10 illustrate a post 287' with a lip 291', wherein the post 287' has a circular cross-section and the lip 291' defines a half-circle that is slightly offset upwardly from the post 287', with the result that the combined post 287' and lip 291' are slightly oval (slightly taller than wide). In this configuration, it may be suitable to form the hole 286*a'* in the latch 286' that receives the post 287' in a similarly slightly oval configuration.

Figure 11:
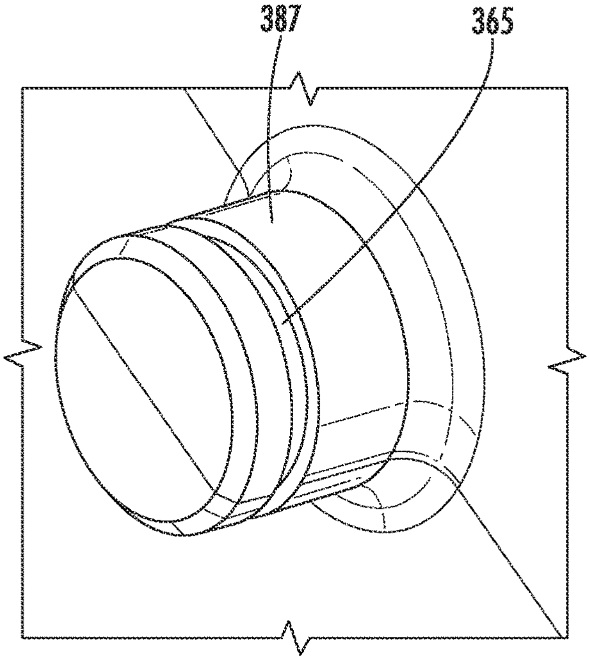
FIG. 11 is a greatly enlarged perspective view of a post for a latch for the cable connector assembly of FIG. 5 according to further embodiments of the invention.
Figure 12:
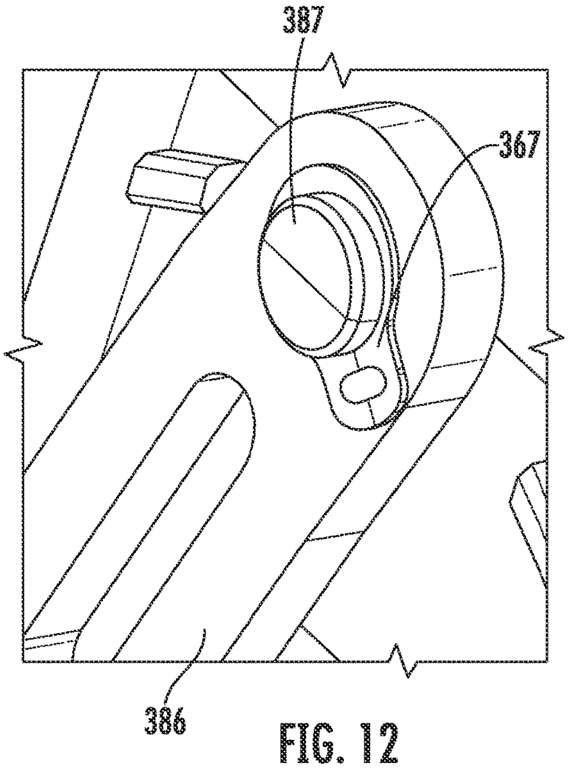
FIG. 12 is an enlarged view of the post of FIG. 11 with a retention clip in place.

Another alternative latch retention configuration is shown in FIGS. 11 and 12. In this configuration, the post 387 has a groove 365 near its free end. The latch 386 fits on the post, and a retention ring 367 is positioned in the groove 365 to maintain the latch 386 in place.

Figure 13:
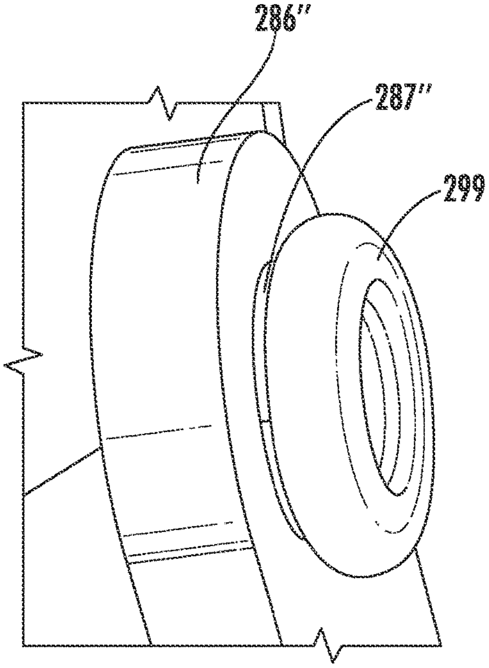
FIG. 13 is a greatly enlarged perspective view of a post for a latch of the cable connector assembly of FIG. 5 in which the post is heat-staked.

A further embodiment is illustrated in FIG. 13. In this configuration, the post 287" has a circular cross-section, but once the latch 286" has been slipped onto the post 287", the end of the post 287" is heat-staked to form an annular ring 299 that maintains the latch 286' in place.

Figure 14:
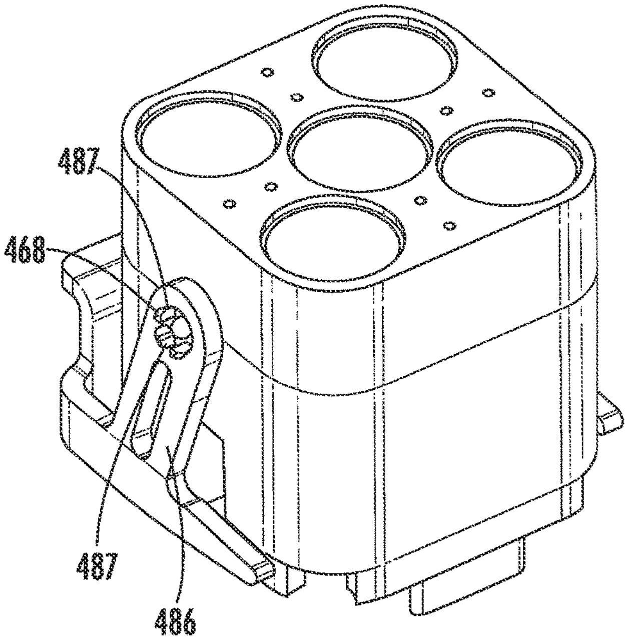
FIG. 14 is a perspective view of a cable connector assembly as in FIG. 5 that employs spring tabs to attach the latch thereto.

A still further embodiment is illustrated in FIG. 14. In this configuration, the post of the prior embodiments is split into plurality of snap-fit beams 487 that are arranged in a circle. Each beam 487 includes a hook 468 that extends radially outwardly. The latch 486 can snap into place onto the beams 487 and is held in place by the hooks 468.

Those of skill in this art will appreciate that the post for the latch may take other forms. For example, if the post is split into beams as shown above, more or fewer beams may be employed, and/or some of the beams may lack a hook (for example, the beams opposite the pin may have hooks, and the beams facing the pin may lack hooks, such that the resulting split post resembles the posts 287, 287' but is split. As another example, a post may be split into beams that lack hooks, but one or more protrusions may be formed via heat-staking or the like. As a further example, the lips 260, 260' may extend or protrude over more or less of a portion of the circumference of the posts 287, 287'. Other variations may be apparent to those of skill in this art.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. A ganged connector assembly, comprising:
- a plurality of coaxial cables;
- a plurality of coaxial connectors, each of the coaxial connectors connected with a respective one of the plurality of coaxial cables;
- a shell surrounding the coaxial connectors, the shell defining a plurality of electrically isolated cavities, each of the coaxial connectors being located in a respective cavity;
- a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and
- a radially outwardly-extending protrusion associated with the post that prevents the latch from slipping off of the post, wherein the protrusion is unitary with the post and comprises a lip that extends circumferentially over about 180 degrees of an outer surface of the post.

2. The ganged connector assembly defined in claim 1, wherein the post has an oval cross-section, such that the lip and the post define a circle.

3. The ganged connector assembly defined in claim 1, wherein the post has a circular cross-section, such that the lip and the post define an oval.

4. The ganged connector assembly defined in claim 1, wherein the protrusion is formed via heat-staking.

5. The ganged connector assembly defined in claim 1, wherein the latch includes a finger that engages the pin and an arm merging with the finger, the arm receiving the post.

6. The ganged connector assembly defined in claim 5, wherein the latch further comprises a handle attached to the arm.

7. The ganged connector assembly defined in claim 5, wherein in the secured position, the finger is generally perpendicular to a line between the post and the pin.

8. The ganged connector assembly defined in claim 7, wherein the handle includes a panel that is generally parallel with the finger.

9. The ganged connector assembly defined in claim 1, wherein the coaxial connectors and the shell are configured so that the coaxial connectors are free to float axially and radially relative to the shell.

10. The ganged connector assembly defined in claim 1, wherein the shell is formed of a polymeric material.

11. A ganged connector assembly, comprising:
- a plurality of coaxial cables;
- a plurality of coaxial connectors, each of the coaxial connectors connected with a respective one of the plurality of coaxial cables;
- a polymeric shell surrounding the coaxial connectors, the shell defining a plurality of electrically isolated cavities, each of the coaxial connectors being located in a respective cavity;
- a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and
- a radially outwardly-extending protrusion that is unitary with the post that prevents the latch from slipping off of the post, wherein the protrusion comprises a heat-staked annular ring at an end of the post.

12. The ganged connector assembly defined in claim 11, wherein the latch includes a finger that engages the pin and an arm merging with the finger, the arm receiving the post.

13. The ganged connector assembly defined in claim 12, wherein the latch further comprises a handle attached to the arm.

14. The ganged connector assembly defined in claim 12, wherein in the secured position, the finger is generally perpendicular to a line between the post and the pin.

15. The ganged connector assembly defined in claim 14, wherein the handle includes a panel that is generally parallel with the finger.

16. The ganged connector assembly defined in claim 11, wherein the coaxial connectors and the shell are configured so that the coaxial connectors are free to float axially and radially relative to the shell.

17. A ganged connector assembly, comprising:
- a plurality of coaxial cables;
- a plurality of coaxial connectors, each of the coaxial connectors connected with a respective one of the plurality of coaxial cables;
- a shell surrounding the coaxial connectors, the shell defining a plurality of electrically isolated cavities, each of the coaxial connectors being located in a respective cavity;
- a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and
- a radially outwardly-extending protrusion associated with the post that prevents the latch from slipping off of the post, wherein the protrusion comprises a retention ring that is received in a groove in the post.

18. A ganged connector assembly, comprising:

a plurality of coaxial cables;

a plurality of coaxial connectors, each of the coaxial connectors connected with a respective one of the plurality of coaxial cables;

a shell surrounding the coaxial connectors, the shell defining a plurality of electrically isolated cavities, each of the coaxial connectors being located in a respective cavity;

a latch that is pivotally attached relative to the shell via a post that extends from the shell and receives an opening in the latch, wherein the latch is configured to engage a pin on a mating ganged connector assembly to secure the ganged connector assembly and the mating ganged connector assembly in a mated condition; and wherein the post comprises a plurality of snap-fit beams, each beam having a hook that extends radially outwardly, and wherein the latch is configured to snap into place onto the beams and held in place by the hooks.

* * * * *